United States Patent [19]

White et al.

[11] Patent Number: 4,932,831

[45] Date of Patent: Jun. 12, 1990

[54] ALL TERRAIN MOBILE ROBOT

[75] Inventors: John R. White, Oak Ridge; Kenneth L. Walker, Clinton; Joel B. Coughlan, Oak Ridge; R. Glen Upton, Oak Ridge; Kenneth A. Farnstrom, Oak Ridge; Howard W. Harvey, Oak Ridge, all of Tenn.

[73] Assignee: Remotec, Inc., Oak Ridge, Tenn.

[21] Appl. No.: 248,973

[22] Filed: Sep. 26, 1988

[51] Int. Cl.⁵ ................................................ B66C 9/00
[52] U.S. Cl. .................................... 414/732; 180/2.1; 180/9.32; 901/1
[58] Field of Search ............................ 414/732; 901/1; 180/8.1, 9.32, 9.62, 2.1, 6.5; 242/54 R; 89/41.01, 41.05; 248/278

[56] References Cited

U.S. PATENT DOCUMENTS

| | | | |
|---|---|---|---|
| 3,280,991 | 10/1966 | Melton et al. | 414/5 |
| 4,145,028 | 3/1979 | Kelley et al. | 242/54 R X |
| 4,483,407 | 11/1984 | Iwamoto et al. | 901/1 X |
| 4,621,562 | 11/1986 | Carr et al. | 89/41.05 |
| 4,817,653 | 4/1989 | Krajicek et al. | 901/1 X |

FOREIGN PATENT DOCUMENTS 98822  8/1964  Denmark .................................. 901/1

Primary Examiner—Frank E. Werner
Assistant Examiner—Donald W. Underwood
Attorney, Agent, or Firm—Pitts and Brittian

[57] ABSTRACT

A remotely controlled vehicle for traversing various terrains to accomplish missions in a hostile environment. This remotely controlled vehicle has a main chassis with rotatable tracks on either side thereof that supports a central body of the vehicle. Auxiliary chassis in a forward and rearward direction also carry tracks on either side, with these auxiliary chassis being pivotable to raised or lowered positions to accomplish movement over uneven terrain. The body carriers a deployable arm including a shoulder, an elbow and a wrist, with this arm being provided with five degrees of motion. The drive means throughout the vehicle for the main tracks and for the essential components of the arm are carried out through the use of motor driven planetary gear assemblies to achieve the necessary torque and speed. The body in one embodiment carries a cable drum and provision is made to rotate the drum, to allow it to be free reeling or to lock the same, in order to control the desired feed to or from the drum of a cable carrying signals to and from the vehicle. All of the motions are controlled remotely from a control station. Except for the shoulder and elbow joints, all wiring of the components is internal, and the position of various elements is determined using potentiometers and the like resistive elements.

11 Claims, 14 Drawing Sheets

ALL TERRAIN MOBILE ROBOT

TECHNICAL FIELD

The present invention relates generally to a vehicle which is remotely controlled by cable or radio, and more particularly to such a vehicle which can be operated over many types of terrain for taking various actions in a hostile environment, such as surveillance, measurements and maintenance within buildings of nuclear power plants, the handling of dangerous materials, or taking various actions such as military intervention or paramilitarian ones such as mine clearance or disposal, reconnaissance, contamination, fire watch and fire control, etc.

BACKGROUND ART

There are many environments in which the local situation would be hazardous to human beings. One such environment may be at high levels. This would include in and around nuclear plants, radioisotope processing plants and the like. In these environments, it is mandatory to regularly inspect the main components during their operation. The high levels of ionizing radiation make the exposure times for human crews very short and, in some instances, even impossible. In addition to routine inspections, there are often situations that exist that necessitate rapid intervention during emergencies. In addition to the high radioactive field, there are often high temperatures and difficult access due to the geometry and congestion of the work place.

Still another environment in which it is very hazardous for intervention by human beings is that involving very dangerous military or paramilitary actions. This includes, for example, investigations for explosives, mine clearance and neutralizing, reconnaissance in a combat area and such activities. Here again, there is often a difficult access due to the geometry and congestion of the working space in the form of narrow halls, stairs, etc.

Closely associated with the military or paramilitary actions are those involved in inspection for fire and control of the same. Each year, numerous fire fighters are injured or killed due to their presence in areas to assess the potential for fire damage with the result that escape routes are closed, buildings collapse and the like.

It has long been recognized that it would be desirable to utilize remotely controlled vehicles in these areas to minimize the hazardous potential to human beings. In fact, various apparatus have been developed to accomplish this purpose. For example, a document entitled "Remote Sensing Technology Proceedings, 32nd Conference On Remote Systems Technology" Vol. 2, 1984, pages 11-18, discloses a remotely controlled vehicle. This vehicle, while mounted on tracks, nevertheless is intended for very specific applications and offers relatively limited capabilities due to its bulk, and its limited monitoring and control equipment. In particular, it is nearly impossible to guide this vehicle over rough terrain for lack of adequate control means and because the remotely controlled vehicle handles relatively poorly. Other remotely controlled vehicles are also known in the prior art, but are excessively large and handle poorly so that their use is limited to applications outside of those wherein there is close confinement.

As an attempt to overcome the problems of prior art remotely controlled vehicles, a vehicle identified as "ANDROS" was developed by ACEC in Belgium. This device had a relatively small and lightweight frame with an independently driven track mounted on each side thereof. In addition, there are a pair of tracks forward of the frame which can be maintained in a horizontal, elevated or depressed position. Similarly, there are a pair of rearward extending tracks which are individually driven, with these tracks also being able to be raised or lowered. Because of this feature, the ANDROS apparatus can be moved across a wide variety of terrain including, but not limited to, staircases. Mounted above the main frame in ANDROS is a segmented compartment for electronics and power supplies, and for circuits for the receipt of vehicle operating signals from a remote location. There is a deployable arm mounted above this control box which can carry at its end various types of equipment, including tongs and the like. This arm is provided with a shoulder joint, an elbow joint and a wrist "roll" in addition to the tongs, etc. Video and light equipment are mounted on the arm so as to illuminate the area of operation of the tools. Wiring to all of the components is external and the arm can only be moved in a vertical plane centered above the vehicle. A remotely viewed video screen displays the image as seen by the video cameras, and an inclinometer mounted in the frame is used to determine a relative position of the frame to the terrain.

Although the ANDROS unit as developed by ACEC of Belgium is deemed to be a very versatile climbing and maneuvering all-terrain vehicle and has a very small "foot print" (the area of the terrain occupied by the vehicle), it has certain disadvantages. These include the limited protection of some components from damage due to water and/or temperature. For example, all of the electrical connections between components are made external to those components such that the damage can easily occur. Furthermore, this construction raises the possibility of physical damage to the electrical wiring system when the vehicle is used in military or paramilitary applications. The inclinometer system of the vehicle is expensive and is subject to a high degree of damage. Also, many of the components were specifically fabricated for this device, thus, increasing substantially the cost of its manufacture. For these and other reasons, an improved version was desirable to provide a vehicle that could be adapted for many types of utilization.

Accordingly, it is an object of the present invention to provide a remotely controlled vehicle that is useful for movement in a hostile environment such as nuclear radiations, high temperature and military and paramilitary utilization.

It is another object of the present invention to provide an all terrain remotely controlled vehicle equipped with necessary instrumentation and mechanism to carry out various actions in these hostile environments.

An additional object is to provide a vehicle of this type wherein the electrical system thereof is adequately protected from the hazards of the environment in which the vehicle is operated.

It is still another object of the present invention to provide a remotely controlled vehicle that is provided with substantially simplified means for determining the relative position of the vehicle with respect to the terrain over which it is has moved.

Another object of the present invention is to provide a remotely controlled vehicle wherein components are more easily removed and replaced than vehicles of the prior art, and the cost of such components is reduced.

It is still another object of the present invention to provide a remotely controlled vehicle wherein the drive mechanism is readily disengaged such that the vehicle can be moved out of the hazardous environment with less effort than those of the prior art.

A further object of the present invention is to provide a remotely controlled all terrain vehicle having an arm for deployment with additional degrees of movement, rather than three as provided for in the prior art, so that operations can be carried out in any direction with respect to the vehicle body itself.

These and other objects of the present invention will become more apparent upon a consideration of the drawings identified below and the detailed description of these and other aspects of the present invention.

DISCLOSURE OF THE INVENTION

In accordance with the present invention, this remotely controlled vehicle has a main chassis with a pair of sprocket wheels on each side thereof. Endless tracks are supported on these sprocket wheels and provide the main means for movement of the vehicle. In addition, there are two auxiliary chassis, one mounted at the front and one mounted at the rear of the main chassis, with each these chassis also carrying a pair of sprocket wheels for driving appropriate tracks. These auxiliary chassis can be raised or lowered angularly so as to adapt the device for movement across terrain of various configurations and containing various obstacles. The drive for the various sprockets of the track system is through compound planetary gear motors in order to achieve the speed and the torque necessary to move the various tracks for manipulating the remotely controlled all terrain vehicle.

A central body member mounted on the main chassis contains the necessary electrical equipment for receiving signals remotely and generating the necessary command signals to components of the vehicle. For embodiments that are to be self-contained, the central body also includes a necessary source of power. This typically is in the form of high capacity batteries. Mounted atop the central body is a foldable arm including, in the preferred embodiment, a shoulder "roll" means to permit movement of the shoulder in a substantially three-hundred sixty (360) degree rotation about a vertical axis in addition to normal "pitch" movement about a horizontal axis. In addition to the shoulder, the arm unit has the equivalent of an elbow and a wrist so that motions can be achieved in a wide degree of space surrounding the vehicle. The wrist, where desired, can support tongs or other operating tools for carrying out various tasks with the subject invention. In the preferred form, the forearm portion is subdivided to provide a motion referred to as wrist "pitch" to further add to the maneuverability of items carried by the wrist of this arm unit. The device is supplied with a video camera unit mounted on the main chassis as well as one that is removably mounted on the arm member. The video unit on the chassis is provided with means for panning and/or tilting the camera, as well as a zoom lens, to view any desired scene within range of the vehicle. Appropriate lighting means are provided for illumination of these areas so that a clear picture is obtained. For embodiments where control signals are to be carried by a cable to the vehicle, the chassis supports a cable reel on top of the body member. This reel is provided with means for driving the same for free reeling of the cable reel or for providing a significant drag to the cable such that additional cable can be withdrawn from a remote source.

BEST MODE FOR CARRYING OUT THE INVENTION

Figure 1:
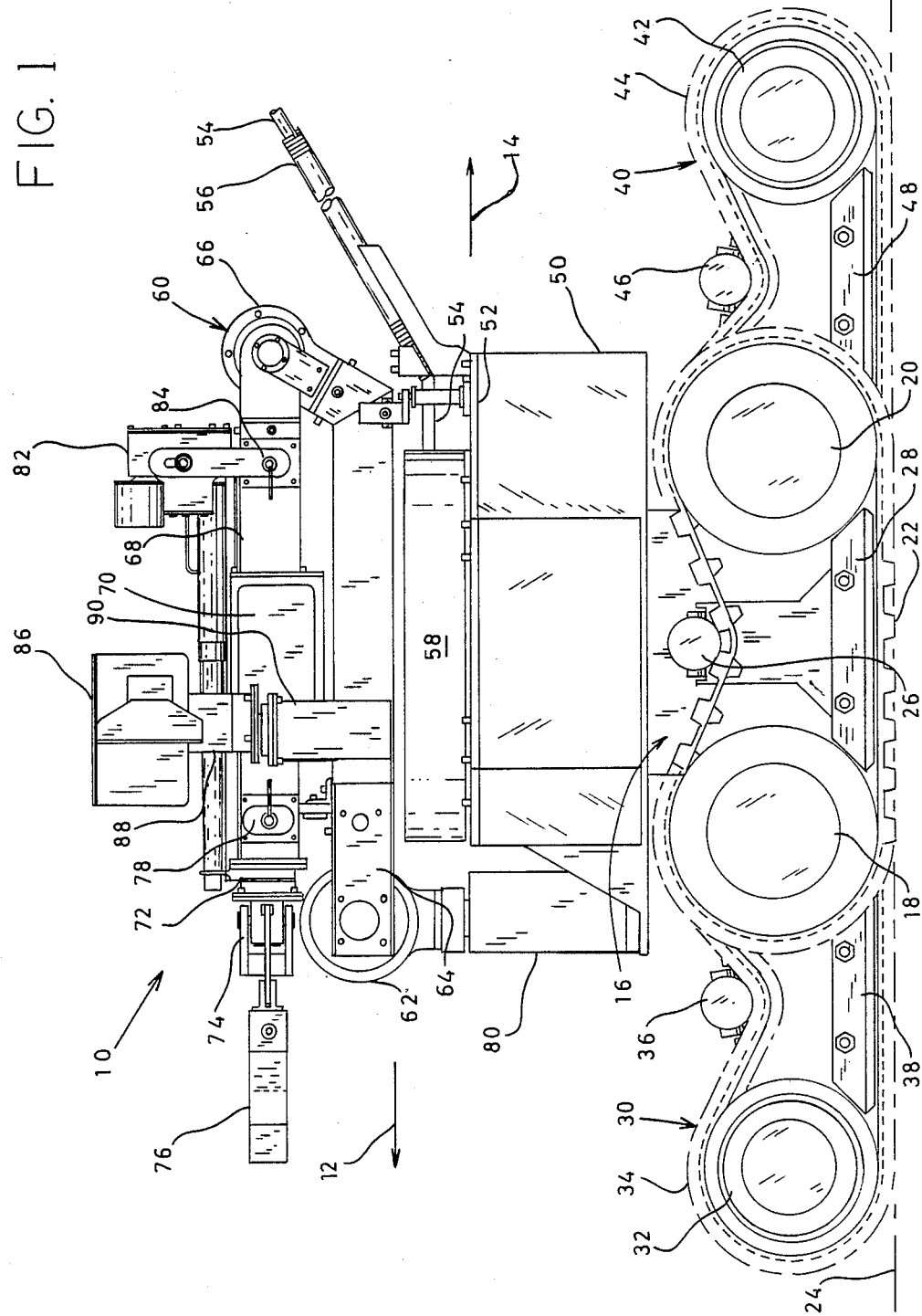
FIG. 1 is a side elevational view of an all terrain, remotely controlled vehicle as developed to accomplish the above stated objects.

Referring now to FIG. 1, shown therein at 10 is a side elevational view of an all terrain vehicle for completely remote operation. For reference purposes, arrow 12 designates a forward direction and arrow 14 a rearward direction for the vehicle. This vehicle has a main chassis member 16 that supports on each side thereof a pair of sprockets 18, 20. These are designed to support an endless track 22. This track 22 has transverse cleats, as shown, which are provided to increase traction when in contact with the terrain indicated at 24. This track 22 is maintained at appropriate tension through an idler indicated at 26, and a shoe 28 provides support for the track between the sprockets 18 and 20.

Figure 2:
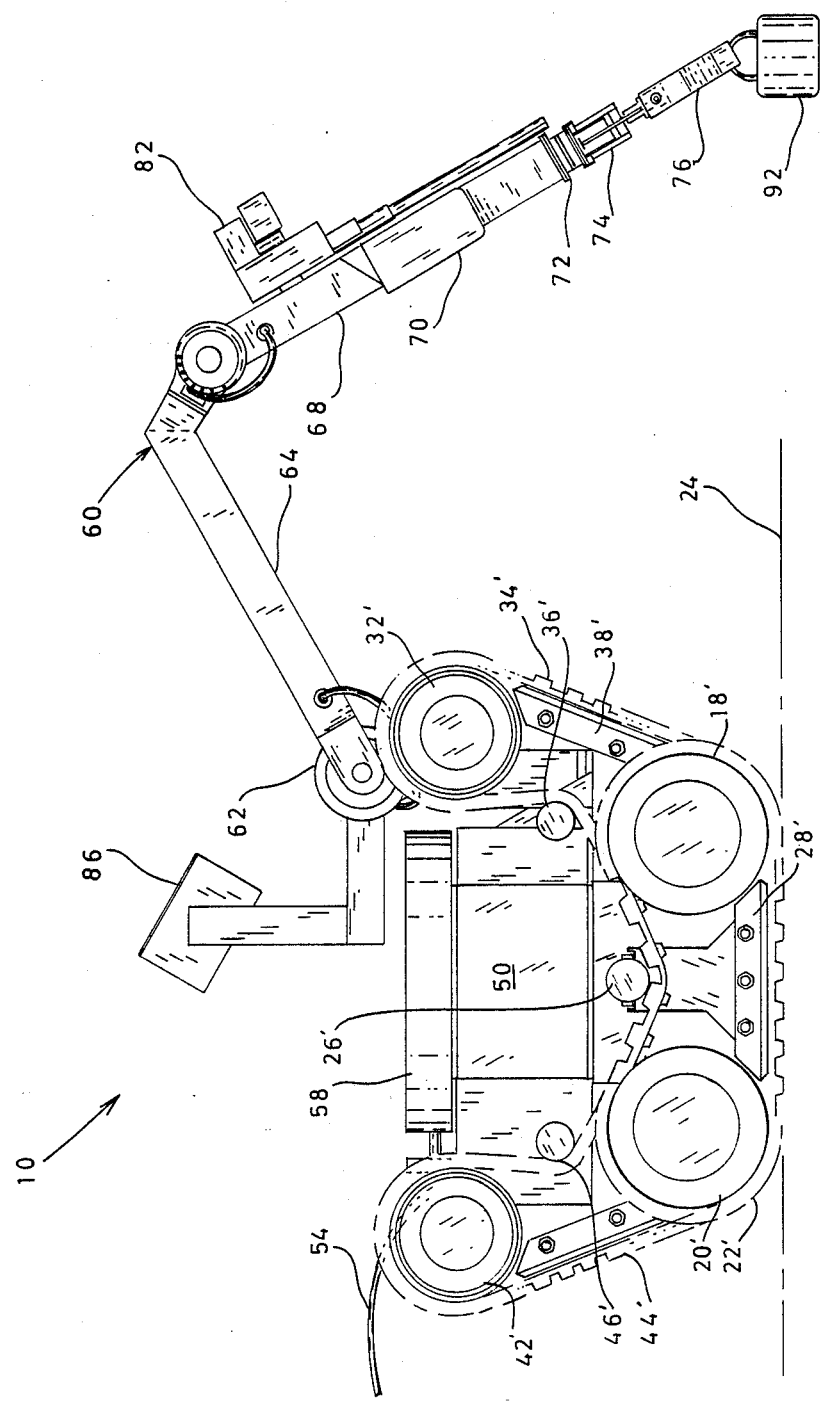
FIG. 2 is a side elevational view of the vehicle of FIG. 1 showing the deployment of the arm in a forward direction as it might be used in placing or removing an object.
Figure 3:
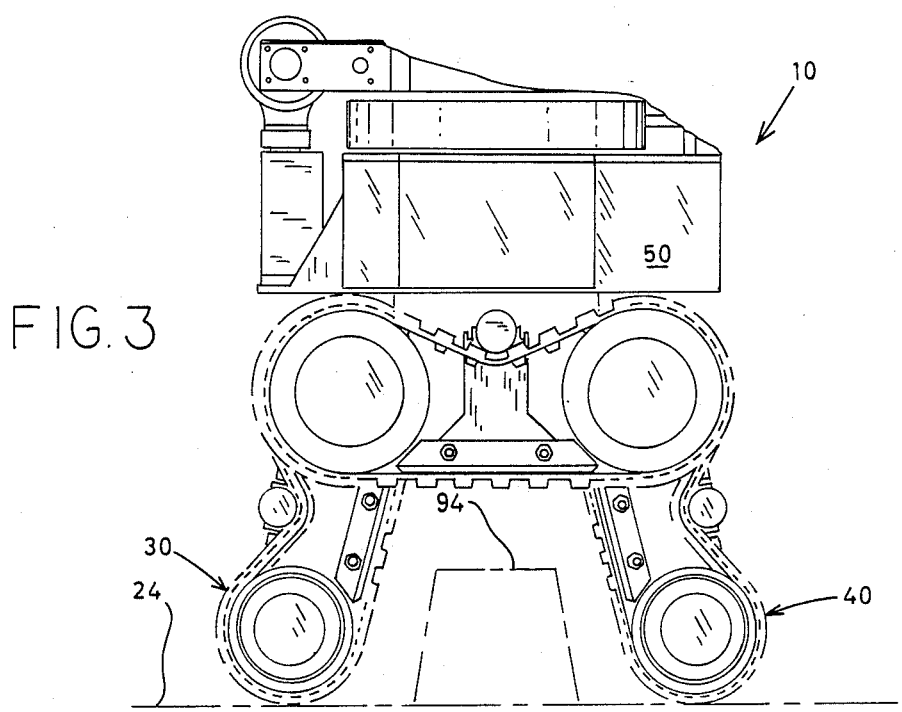
FIG. 3 is a side elevational view of the vehicle of FIG. 1 partly cut away showing the deployment of the auxiliary chassis and the tracks associated therewith as they might be oriented to move over a specific obstacle.
Figure 4:
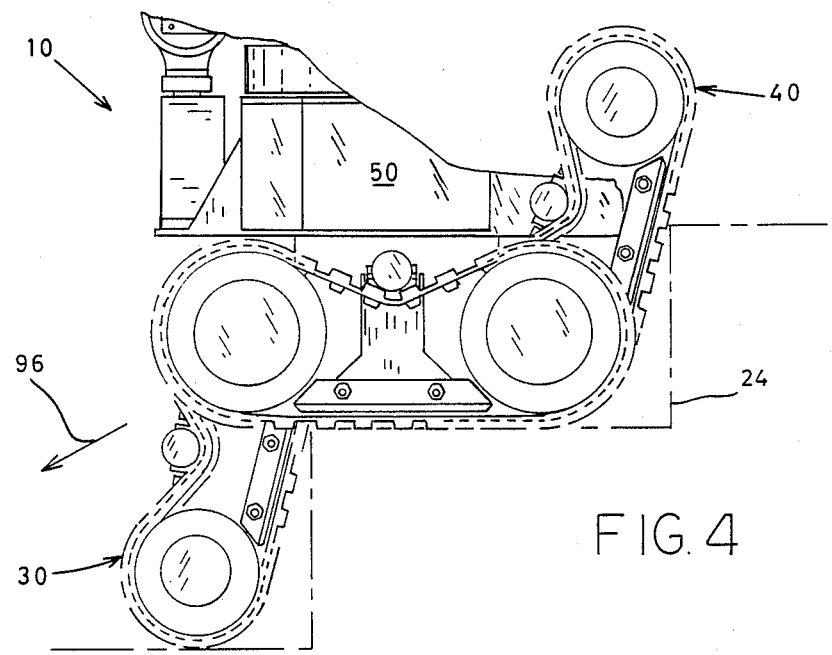
FIG. 4 is a side elevational view of the vehicle of FIG. 1 showing the deployment of the auxiliary chassis and their tracks as when the vehicle is used for climbing stairs or going up similar inclines, for example.

The main chassis member 16 supports a forward auxiliary chassis member 30 which, as will be discussed hereinafter, is pivotally mounted on the main chassis member. This forward auxiliary member supports a forward sprocket 32, as well as a second sprocket (not shown), that rotates about the same axis as sprocket 18. These two sprockets support one of forward endless belts or tracks 34, with this endless track also having transverse cleat members as indicated in FIGS. 2-4. As will be discussed with regard to FIG. 5, the auxiliary track 34 has an identical mate on the other side of the forward auxiliary chassis member 30. It can be seen that the auxiliary track 34 is tensioned over its relative sprockets by an idler 36, and a further shoe member 38 supports a lower portion of the auxiliary track when in contact with any terrain. In a similar manner, there is provided a rearward auxiliary chassis member 40 which includes a rearward sprocket 42, a rearward auxiliary track 44, an appropriate idler 46 and shoe 48. This rearward auxiliary chassis 40 also has a second auxiliary track at the far side thereof, as will be shown and described with reference to FIG. 5.

Mounted on top of the main chassis member 16 is a hollow body member 50. This body 50 contains necessary signal-receiving systems as well as signal initiation systems for driving the various motors used in the manipulation and movement of the present invention. Appropriate power supplies can be contained within the body 50 to provide the necessary operating voltages for the circuits. This body is sealed with a cover 52, and appropriate gasketing (not shown) is utilized between the body and the cover 52 whereby the interior of the body 50 is completely impervious to any component of the environment surrounding the vehicle. Thus, any equipment therein is protected from heat, moisture, smoke and various other gases that might adversely affect operation of this equipment.

In some applications of the present vehicle, the vehicle will be provided with an umbilical cable as indicated at 54. This cable 54 is fed through a flexible casing 56 adjacent the vehicle and then enters a cable reel 58. This cable reel 58 is described in more detail in connection with FIG. 15.

Mounted from a forward portion of the body 50 is a deployable arm member 60. This arm member consists of a shoulder joint or member 62, an upper arm member 64, an elbow member 66 and a forearm member 68. This forearm can include, in a preferred embodiment, a wrist "pitch" member 70 to add another degree of motion to the arm. The forearm 68 is provided at its termination with a wrist member 72 to which is attached a gripper member 74 holding, in this particular embodiment, tong means 76. A quick disconnect means 78 is provided whereby the wrist, and any portions attached thereto, can be readily removed from the forearm 68. The aforementioned wrist pitch member 70 is described in more detail in connection with FIG. 12. In the embodiment illustrated in FIG. 1, the shoulder member 62 is mounted from a shoulder "roll" means 80, the purpose of which will be described hereinafter in connection with FIG. 8.

Releasably mounted on the forearm 68 is a video camera unit 82 which includes appropriate light means. This unit is directed so as to view an area directly forward of the forearm 68 of the arm 60. It is releasably attached to the forearm with a quick disconnect mechanism indicated at 84 which can be of the same type as at 78. A second video camera unit 86 is mounted on an extension from the main chassis member and includes an appropriate light source therein. This video equipment unit is provided with remotely controlled moving means in the form of a tilt mechanism 88 and a pan mechanism 90. Details thereof are given in connection with FIGS. 16 and 17. Also, the video camera unit 86 is provided with a remotely operated zoom lens.

As mentioned above, the arm 60 can be deployed into various configurations in order to accomplish the desired task. One such configuration is that illustrated in FIG. 2 where the tongs 76 are utilized to grasp an object 92. It can be seen that the video camera unit 82 is directed toward the object 92 and that the video camera unit 86, through appropriate operation of its tilt mechanism, can also be directed in the same area. Of course the arm 60 and its components can be directed, if desired, at a point substantially vertically above the vehicle 10 or at other selected directions upon operation by the control equipment within the body 50.

The vehicle 10 in this FIG. 2 is shown from the opposite side as in FIG. 1, and it can be seen that the opposite sprockets and tracks of the main chassis and the auxiliary chassis are identical to those described above. The same numerals are used to identify these items except that they have been primed to indicate that they are on the opposite side of the vehicle 10. In this FIG. 2 the forward auxiliary chassis 30 and the rearward auxiliary chassis 40 have been moved to their most upward pivotal position. This is for illustration purposes only since, if the object 92 has sufficient weight, it would be necessary to have these auxiliary chassis means and their respective tracks fully in contact with the terrain. However, with the auxiliary chassis in the position shown in FIG. 2, and with the arm fully folded and in the stored position as indicated in FIG. 1, the total vehicle 10 occupies a minimum volume as in the case of shipping, etc.

In addition to the raised position of the auxiliary chassis indicated in FIG. 2, these auxiliary chassis 30, 40 can both be pivotally moved downwardly to a substantially vertical position as indicated in FIG. 3. This would enable the vehicle 10 to move over an obstacle on the terrain 24 such as indicated at 94. Of course, the movement to this position would be gradual to permit the vehicle to traverse the obstacle while maintaining the body 50 in a substantially horizontal orientation as shown.

Furthermore, one of the auxiliary chassis can be pivoted downwardly and the other pivoted upwardly as illustrated in FIG. 4. This might be the configuration if the terrain 24' has an upward (or downward) orientation such as the encountering of stairs with the vehicle moving in a direction as indicated by arrow 96. Thus, it can be seen that through the proper positioning of the auxiliary chassis, the vehicle 10 can be moved across terrains of various configurations, and yet maintain the body 50 substantially horizontal as indicated in all of these figures.

Figure 5:
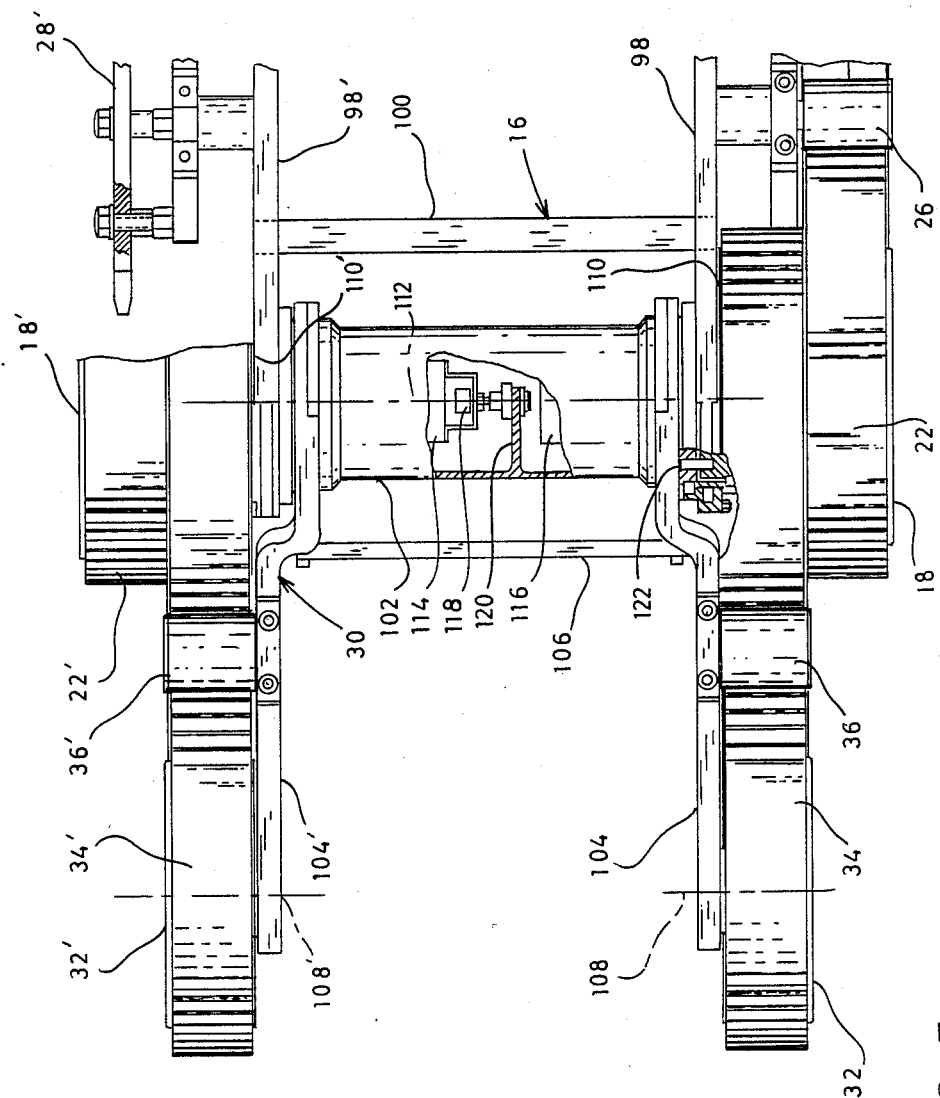
FIG. 5 is a top view of the chassis components of the vehicle of FIG. 1 partly cut away showing the position of the various drive elements for the sprockets and the relative position of the tracks on the auxiliary chassis versus the tracks on the main chassis of the device.

Shown in FIG. 5 are some of the details of the main chassis member 16 and the forward auxiliary chassis 30 of the vehicle of the present invention. The main chassis, for example, is fabricated from a pair of side plates 98, 98', joined by a plurality of cross members 100 (only one shown). These components are considered to be static or nonmoving as compared to some of the other components of the chassis assemblies. Also substantially extending between the side plates 98, 98' is a rotatable cylindrical housing or axle 102. This housing forms a portion of the forward auxiliary chassis 30. This cylinder is joined at opposite ends to a pair of arms 104, 104', with sprockets 32, 32' at the outer ends thereof rotatable about their respective axis 108, 108'. A cross member 106 joins the arms 104, 104' as indicated. Also shown in this figure are the sprockets at the opposite end of the tracks 34, 34', these sprockets being 110, 110', which rotate about an axis 112 that is common with the axis of rotation of sprockets 18, 18'. Sprockets 110, 110' are, in fact, driven by the same rotating means as drives sprockets 18, 18'.

Positioned within the housing 102 is a first drive means 114 that is fixed relative to the chassis 16 and is used to drive the sprockets 18' and 110'. A second drive means 116 is also contained within the housing 102. This drive means 116 is positioned relative to the housing 102 and is utilized to raise and lower the arms 104, 104', in accordance with operation of the present invention. This second drive means is referred to as a track lift drive means. Within the housing 102, and mounted on the axis thereof, is a track lift indicator in the form of a potentiometer 118. The body thereof is fixed and the shaft thereof is rotated by the arm 120 attached to the inner surface of the housing 102. Pins 122 in the output plate (See FIG. 7) mate with appropriate holes in the end of the housing 102. In this manner, as the forward auxiliary chassis is either raised or lowered, the potentiometer 118 provides a signal indicating the effective position of this auxiliary chassis 30 and, therefore, is indicative of the terrain over which the vehicle is being moved.

This FIG. 5 depicts roughly one-half of the chassis mechanism of the present invention, there being the aforementioned rearward auxiliary chassis (See FIG. 1). This rearward auxiliary chassis is substantially identical to the forward auxiliary chassis, except that all components are substantially reversed. Thus, the drive means for the tracks are mounted on the opposite end of its respective rotating housing, just as the track lift means is reversed. Accordingly, each end of the device has a separate drive means for driving the tracks on opposite sides of the vehicle, and each end has separate means for raising and lowering the auxiliary chassis with respect to the main chassis. All components are accordingly substitutable for either end.

Figure 6:
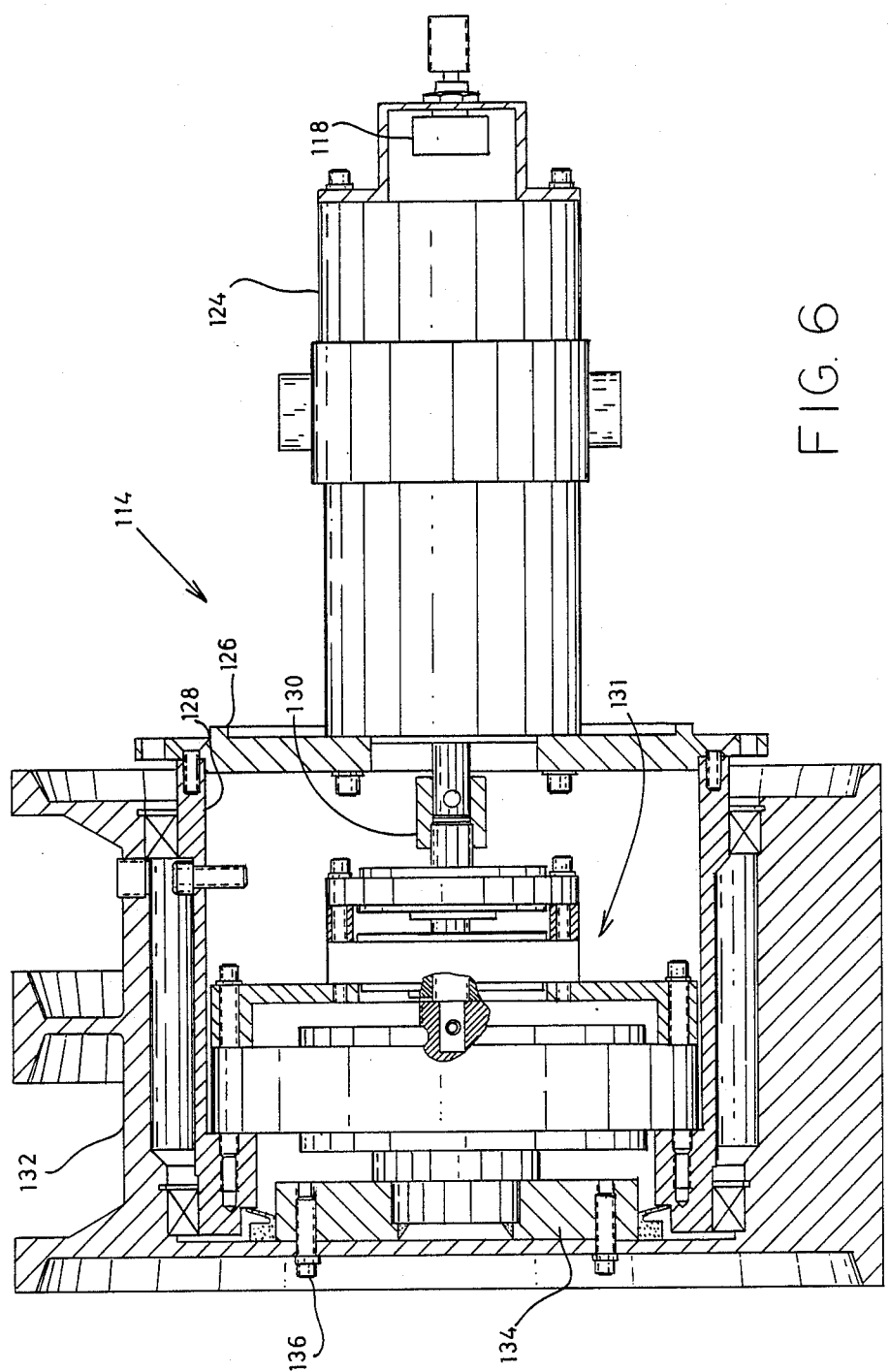
FIG. 6 is a cross-sectional drawing illustrating the drive unit used for moving the track on the sprockets of the vehicle.

The track drive means 114 is shown in greater detail in FIG. 6. An electrical motor 124 is mounted by any suitable means to a mounting plate 126 to which, in turn, is attached a cylindrical track drive shaft 128. As stated previously, this track drive shaft 128 is maintained in a fixed angular orientation at all times. The motor 124, via shaft 130, drives a plurality of planetary gear elements 131 selected to achieve a desired ratio between the rotation of the motor 124 and a track drive wheel 132. It can be seen that this track drive wheel 132 is attached to an output shaft 134 of the final section of planetary gears 131 by a plurality of screws 136. As discussed hereinafter, the track drive means can be disabled by removal of these bolts 136, whereby the vehicle can be physically moved if it becomes disabled for any reason. In this figure, it can again be seen that the potentiometer 118 for measuring the track lift position is attached on the end of the motor for the track drive.

Figure 7:
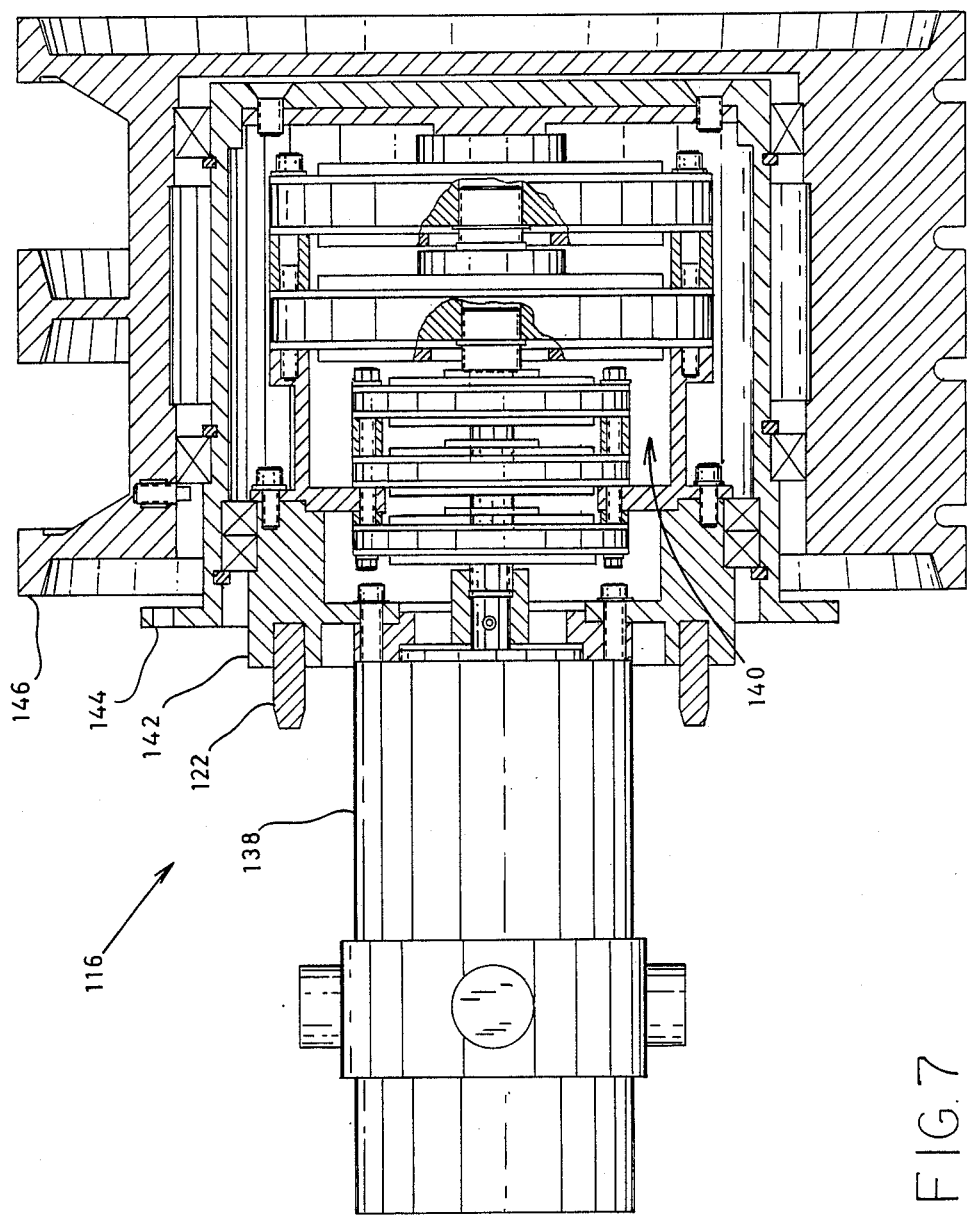
FIG. 7 is a cross-sectional view of the drive unit used for moving the auxiliary chassis into the various positions as illustrated in FIGS. 1-4.

The track lift mechanism 116 indicated in FIG. 5 is shown in greater detail in FIG. 7. This mechanism has similarities to the track drive means of FIG. 6 in that there is an electrical motor 138 driving a plurality of planetary gear elements 140. The number of elements and the gear ratio of each is chosen to provide the desired speed and torque for pivotal movement of the forward and rearward auxiliary chassis. The rotary output of the planetary gear system appears on the output plate 142 where motion is relative between that plate and a fixed cylindrical housing 144 which is attached to the main chassis of the vehicle. Through use of the aforementioned pins 122, this output plate is connected to the rotating housing 102 illustrated in FIG. 5. The cylindrical housing 144 is generally surrounded with an idler wheel 146 for its respective track. From a discussion of this FIG. 7, together with that of FIGS. 5 and 6, it can be seen that provision is made for driving the tracks of the vehicle of the present invention as well as pivoting the forward and rearward auxiliary chassis and their respective tracks so that any desired terrain can be traversed by the vehicle.

Figure 8:
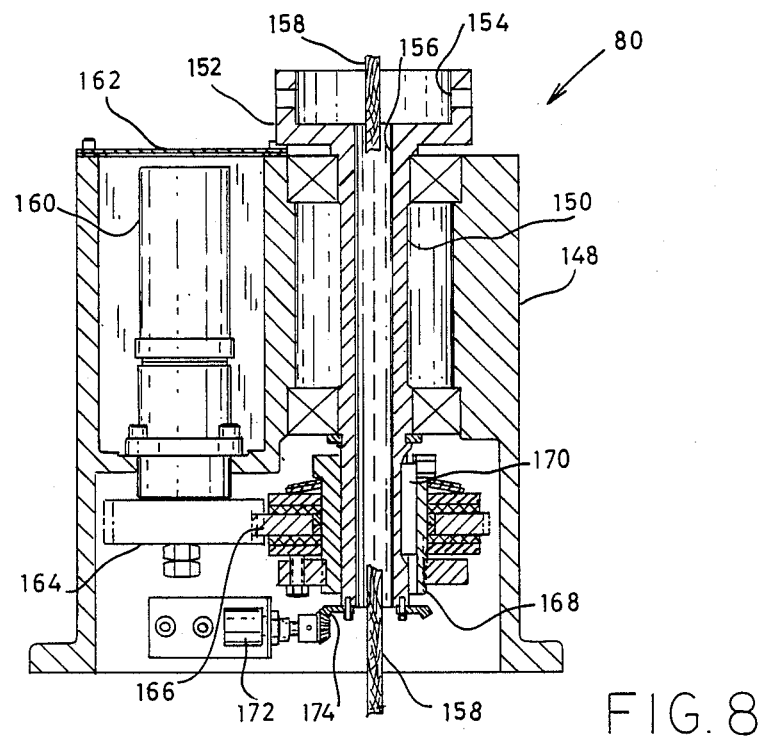
FIG. 8 is a cross-sectional drawing illustrating the drive mechanism to accomplish the motion referred to as shoulder "roll" so as to give the arm on the vehicle an additional degree of freedom of motion.

One of the features of the preferred embodiment of the present is the capability of rotating the entire arm 60 so as to achieve five degrees of motion rather than the three that can be achieved with the arm on the vehicle of the prior art. As stated, the prior art can only manipulate and deploy the arm in a single plane projected vertically above the center of the vehicle in a forward or rearward direction. One of the additional motions is provided by the unit identified as shoulder "roll" 80 in FIG. 1. A cross-sectional drawing of this element is shown in FIG. 8. This shoulder roll 80 has a generally rectangular body 148. Rotatably positioned within this body is a shaft 150 which terminates at an upper end 152 in an open cup 154. This cup receives a member of the shoulder joint 62 (See FIG. 9). The shaft 150 is provided with an axial bore 156 as shown. This hollow shaft provides a conduit for a cable 158 leading to other components of the arm 60. Also mounted within the housing 148 is an electrical drive motor 160. Access is made to this motor through a removable cover 162. The output of the motor is coupled to a gear 164 which, in turn, meshes with a second gear 166 surrounding the lower portion of the aforementioned shaft 150. This gear 166 is coupled to a slip clutch 168 with a preset torque which is affixed to the shaft 150 with a key 170. This prevents damage to the arm in the event the vehicle is moved while the gripper is grasping an object. The relative rotational position of the shaft 150 is determined from signals derived from a potentiometer 172 which is driven by a gear train 174. Thus, through the operation of the motor 160, the cup portion 152 can be rotated thereby rotating the shoulder joint around the axis of the shaft 150.

Figure 9:
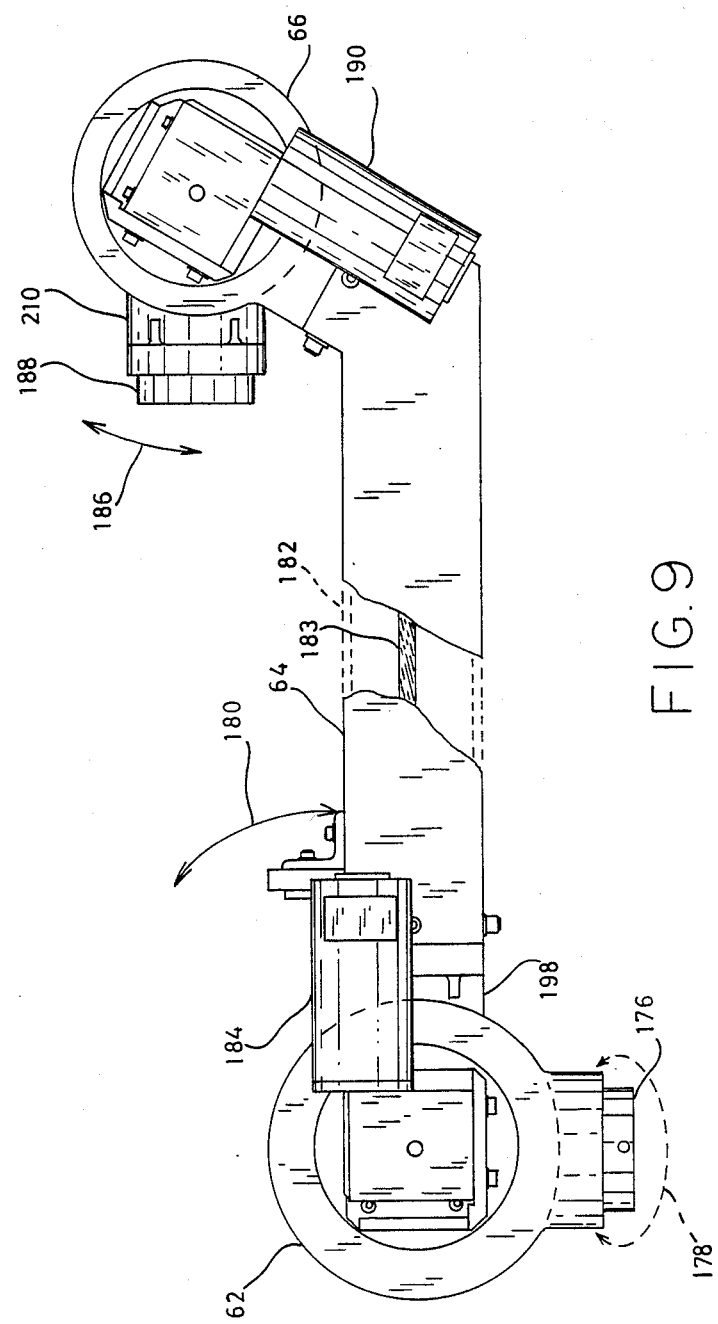
FIG. 9 is a drawing illustrating the upper arm portion of the arm of the present invention, this upper arm having a shoulder at one end and an elbow at the second end.

The combined upper arm 64 together with the shoulder 62 and elbow 66 are illustrated in FIG. 9. The shoulder housing has a projection 176 for mating with the aforementioned socket 154 of the shoulder roll mechanism 80. Accordingly, the shoulder 62 can be rotated in a direction indicated by the arrow 178. Due to the drive mechanism within the shoulder 62, as will be discussed hereinafter, the upper arm 64 can be moved in a direction indicated by the arrow 180 from a horizontal position, as indicated, to approximately a horizontal position in the opposite direction. As with other components, the upper arm 64 is provided with a passageway 182 for the passage therethrough of necessary cables 183 to remaining components of the arm. The shoulder pitch rotation in the direction indicated by the arrow 180 is accomplished through operation of the motor 184 in a manner described hereinafter.

The elbow mechanism 66 at the opposite end of the upper arm 64 functions in a similar manner to the shoulder in that it provides for pitch motion of the forearm (not shown in this figure) in a direction indicated by the arrow 186. This forearm attaches at the mounting boss 188. Motion is accomplished to move the forearm from a substantially horizontal position to a position fully extended with respect to the upper arm 64. This motion is accomplished using a motor 190 in the manner described further with regard to FIG. 11.

Figure 10:
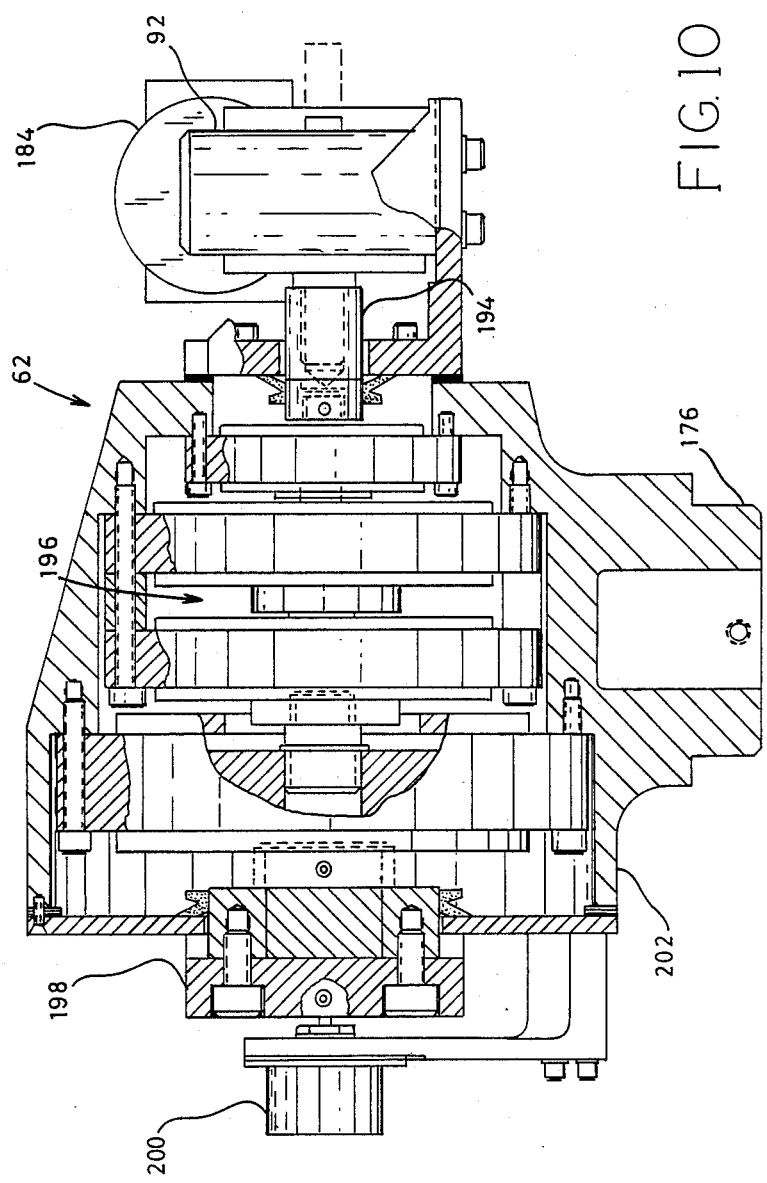
FIG. 10 is a cross-sectional drawing showing the drive unit for accomplishing "pitch" motion at the shoulder joint of the upper arm of FIG. 9.

The actual drive mechanism positioned in the shoulder 62 is illustrated in FIG. 10. The electrical drive motor 184, through appropriate gear means 192, gives rise to rotation of a shaft 194. Rotation thereof drives a series of planetary gear systems 196 resulting in &he desired rotation of a shoulder pivot plate 198, to which the upper arm 64 is attached. The choice of the gear ratios in the planetary gear systems and the number of planetary gear systems is chosen to provide the desired torque and rotational speed of the pivot plate 198. As with the other motions, the rotational position of the pivot plate 198 is monitored by deriving a signal from a potentiometer 200 which monitors the rotational difference between the body 202 and the shoulder pivot plate 198.

Figure 11:
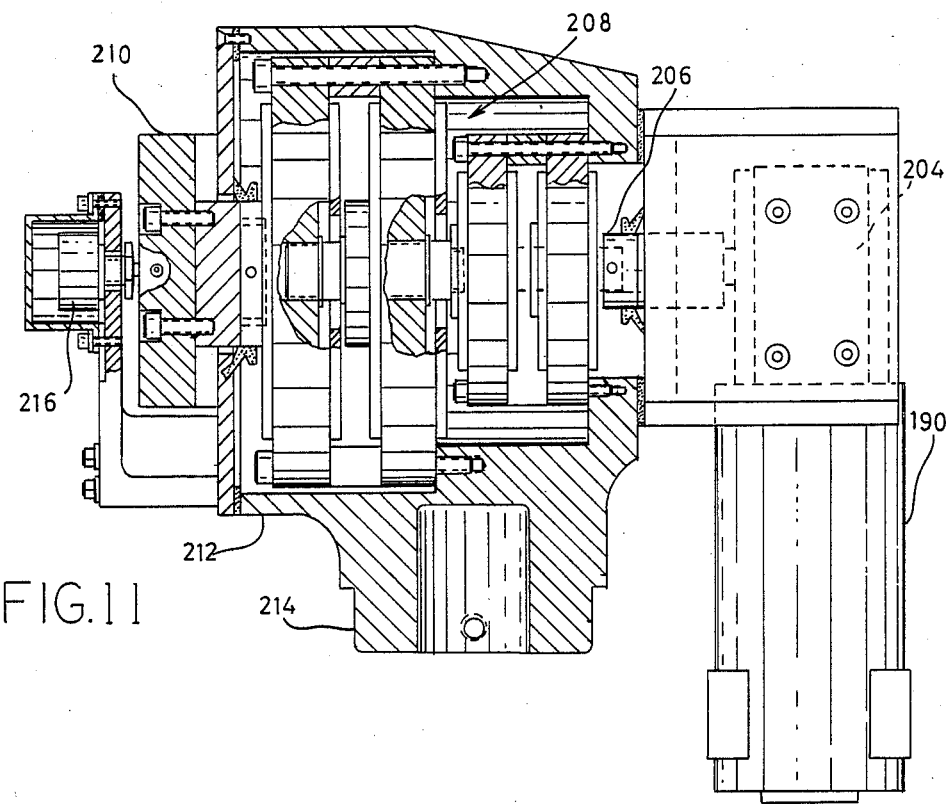
FIG. 11 is a cross-sectional drawing of the drive mechanism used to provide "pitch" at the elbow portion of the upper arm of FIG. 9.

A very similar mechanism is utilized for the elbow 66 of the present invention This is illustrated in FIG. 11. The electrical drive motor 190, through an appropriate gear system 204, gives rise to rotation of a shaft 206. This shaft, in turn, rotates a plurality of planetary gear systems 208 resulting in the ultimate rotation of an elbow pivot plate 210. Rotation of this below pivot plate 210 results in the aforementioned motion 186 (See FIG. 9). The elbow unit has a body 212 provided with a boss 214 for receiving the elbow end of the upper arm 64. A potentiometer unit 216 is provided for supplying a signal relative to the degree of rotation between the elbow pivot plate 210 and the housing 212. Although not shown in this FIG. 11 (or FIG. 10), provision is made to direct control wires from the upper arm 64 into the forearm unit to be described hereinafter. These cables also are routed to the motor 190 and to the potentiometer 216.

Figure 12:
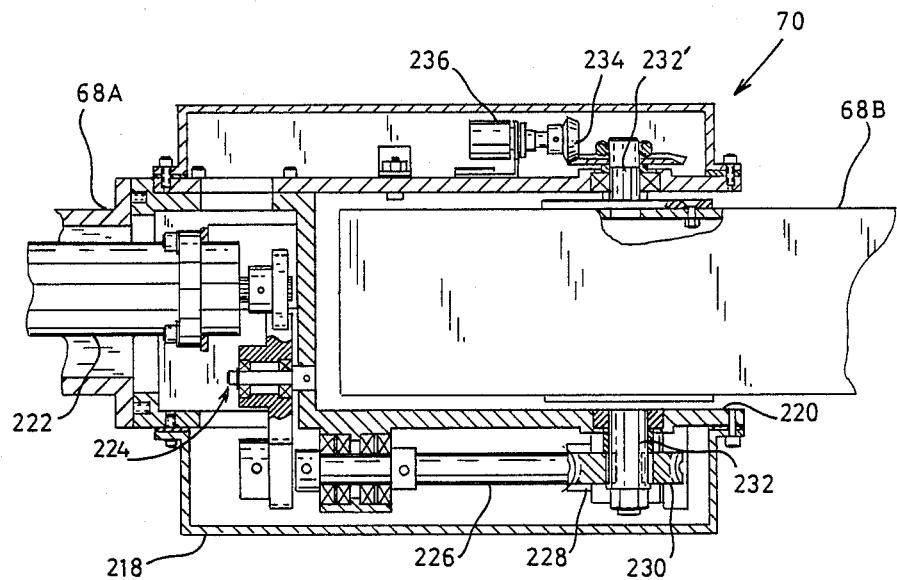
FIG. 12 is a cross-sectional view of the mechanism to provide "pitch" for the wrist portion of the arm unit of the vehicle.

In the preferred embodiment of the present invention, the forearm 68 is divided into two portions: portion 68A in a direction toward the elbow; and portion 68B in a direction toward the wrist. Intermediate these two portions is the wrist pitch assembly 70 that was shown in FIG. 1. A cross-sectional view of this wrist pitch assembly is shown in FIG. 12. This assembly has a generally U-shaped housing 218 with the opening between the legs thereof indicated at 220. An electrical motor 222 is positioned within the upper portion 68A of the forearm for the driving of an appropriate set of gears 224 and thence a shaft 226. The distal end of this shaft 226 is provided with a worm gear 228 which meshes with worm gear 230, whereby shaft 232 is rotated. This shaft 232 is affixed to the forearm portion 68B, whereby shaft portion 68B can be pivoted about the axis of shaft 232 to accomplish the wrist pitch motion. A shaft 232' drives an auxiliary set of gears 234 for the purpose of driving a potentiometer 236 in order to derive a signal relative to the degree of motion of portion 68B with respect to the housing 218 (and portion 68A). Although not shown, provision is made to thread necessary cables for further portions of the arm through the forearm portions 68A and 68B.

Figure 13:
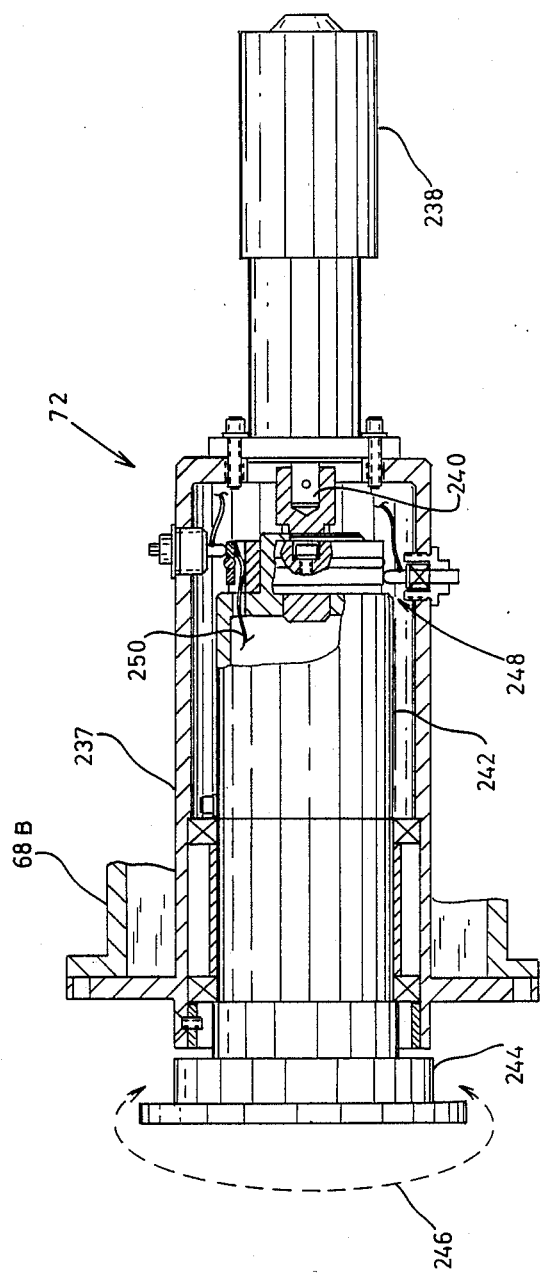
FIG. 13 is a cross-sectional drawing illustrating the drive means for the wrist "roll" portion of the device whereby continuous rotation can be accomplished at the wrist for certain applications of the present invention.

The wrist roll mechanism 72 is illustrated in FIG. 13. This has a housing 237 that fits within the forearm portion 68B as shown. An electrical drive motor 238 produces rotation of a shaft 240 and a corresponding rotation of an inner sleeve 242. Mounted on the exposed end of the sleeve 242 is the wrist pivot member 244 which can be caused to be rotated continuously or intermittently in a direction indicated by the arrow 246. Since continuous motion is often desired for this unit, provision is made by way of a slip ring means 248 to power leads 250 leading to a gripper mechanism attached to the wrist pivot plate 244. Through this mechanism, energization of the motor 238 causes rotation of the wrist pivot plate 244 on a continuous or intermittent basis in either direction. This motion is particularly useful when various rotary tools are to be operated by the arm 60 of the present invention.

Figure 14:
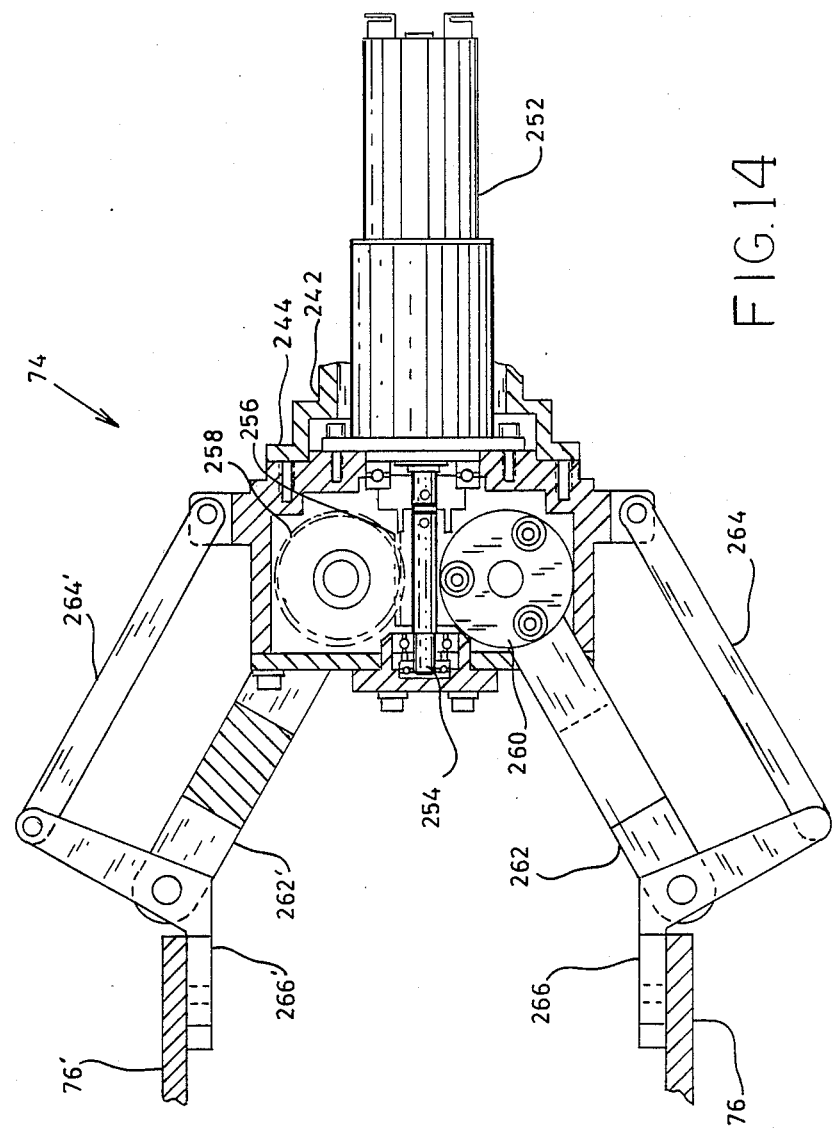
FIG. 14 is a cross-sectional drawing of the gripper mechanism which is releasably attached to the wrist portion of the arm unit of the present vehicle with this gripper element adapted to receive finger tongs or other appropriate mechanisms for carrying out the tasks of the arm unit.

Attached to the wrist pivot member 244 is a gripper means 74 as shown in FIG. 14. This gripper means has an electrical motor 252 which fits within the aforementioned sleeve 242 of the wrist roll mechanism. This motor 252 drives a shaft 254 having attached thereto a worm gear 256. This worm gear 256, in turn, is engaged with a pair of worm gears 258 (only one shown). Each of these worm gears 258 causes a circular disk 260 to be rotated thereby producing pivotal motion of arms 262, 262'. A second pair of arms 264, 264' are parallel to the arms 262, 262' and thereby maintain mounting surfaces 266, 266' parallel at all spacings therebetween. These mounting surfaces are used, for example, to attach the tong units 76, 76' such as are shown in FIGS. 1 and 2. It will be recognized by persons versed in the art that other devices can be attached to these mounting surfaces 266, 266' for appropriate operation thereof. Furthermore, the gripper means 74 can be removed and other necessary or desired equipment can be substituted therefor.

Figure 15:
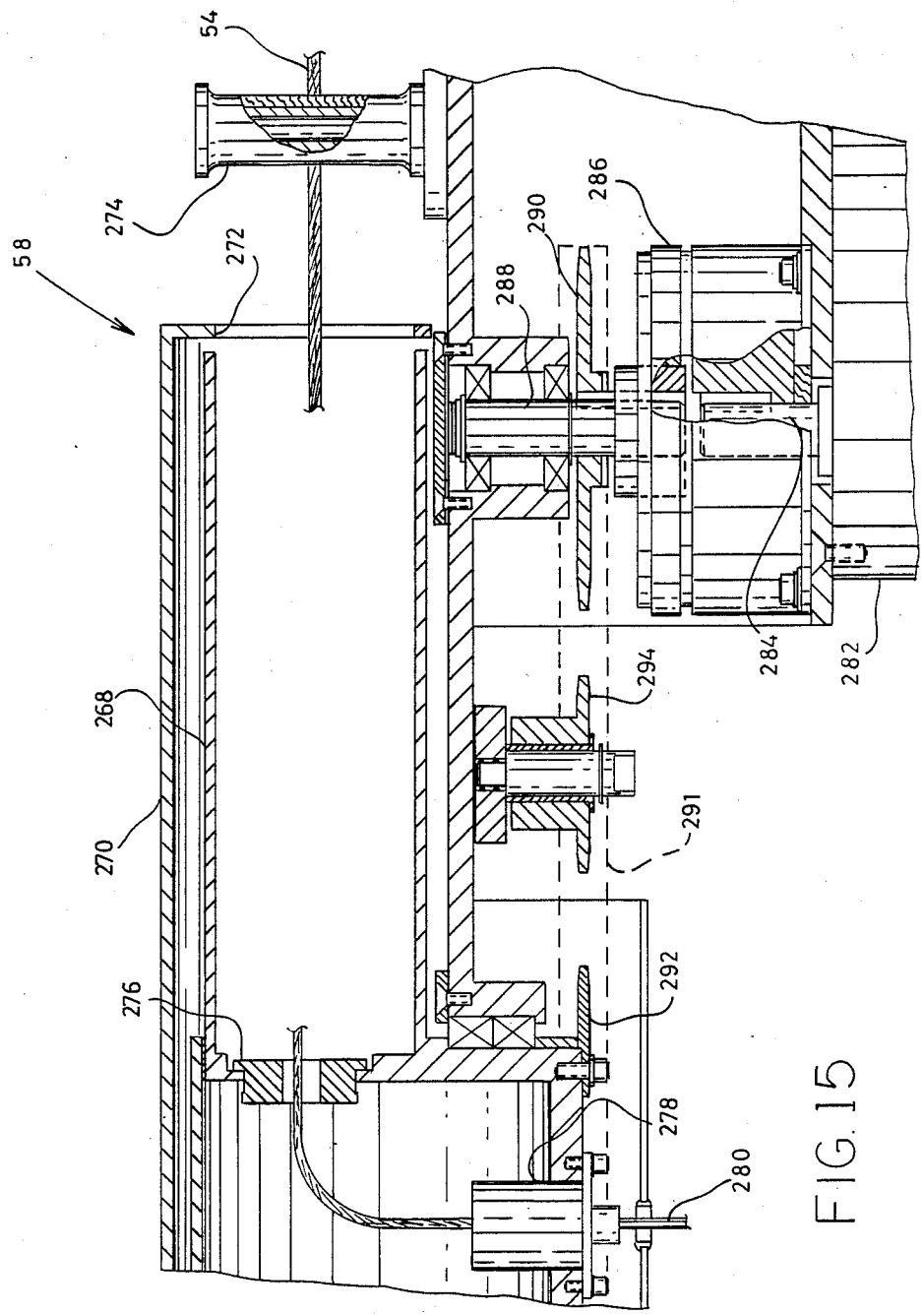
FIG. 15 is a cross-sectional drawing of a cable reel useful for the present invention showing the drive means and clutch therefor.

The present invention can be operated either by transmitted signals broadcast to receiving equipment within the body 50 or from an external source using the aforementioned cable 54. In those applications where the external signal source is utilized via the cable of 54, the cable reel assembly 58 of FIG. 15 is utilized. This cable reel assembly has a rotatable drum 268 generally protected with a cover 270. The cable 54 enters through the cover 270 via an opening 272 so as to be wound on the drum 268. The cable 54 is generally guided by a roller 274 to provide alignment through the opening 272. The opposite end of the cable passes through grommet 276 and thence to a slip ring assembly 278. A cable 280 from the slip ring assembly then is directed to appropriate connections within the aforementioned body 50. The cable drum assembly is powered by electric motor 282 having an output shaft 284. This output shaft is connected to an electromagnetic clutch assembly 286 that can couple or decouple the shaft 284 with an output shaft 288. This output shaft carries a sprocket 290 to drive a belt or chain element 291 to couple with sprocket 292. An idler sprocket 294 is utilized to maintain tension on the drive chain. Thus, when sprocket 290 is rotated, sprocket 292 and the drum 268 are rotated to either wind the cable 54 onto or off of the drum. The aforementioned clutch provides three types of conditions. In one, the shaft 284 is coupled to the shaft 288 thereby causing the drum 268 to be rotated by the motor to accomplish, for example, winding of the cable 54 thereon. In a second condition, the clutch completely disengages the shaft 288 from 284 whereby the drum 268 can freely rotate permitting the cable 54 to be drawn from the cable drum 268. A third condition exists when the motor 282 is not energized and the clutch is used to lock the shaft 284 to shaft 288, whereby the drum cannot be rotated (the motor acting as a brake). In this condition the vehicle can be moved and the cable 54 can be drawn from another source. Thus, a substantial portion of cable or a auxiliary cable can be unwound from a drum at a remote location to add additional length of cable for operation of the vehicle.

Figure 17:
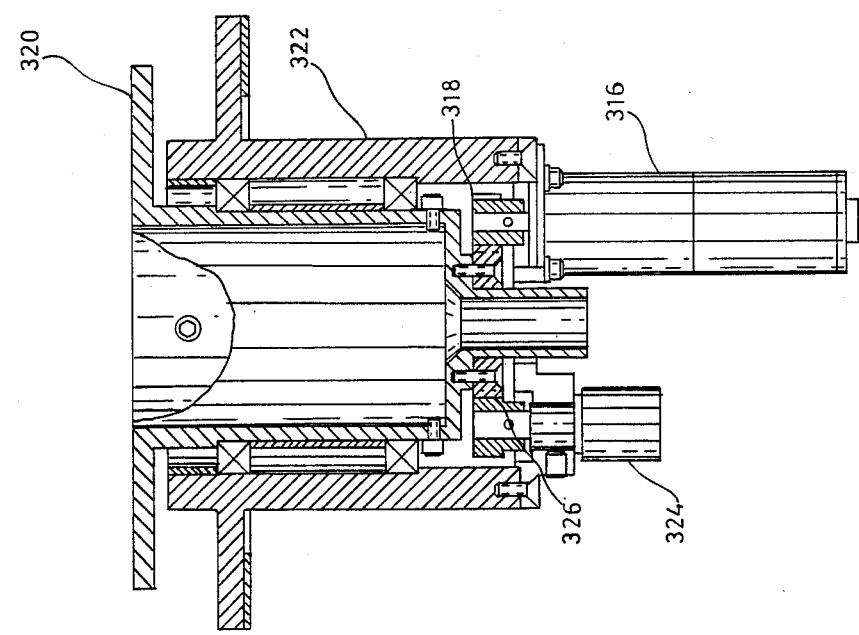
FIG. 17 is a cross-sectional view of the mechanism useful for driving the video camera unit about a central axis, namely panning the camera unit around the vehicle.
Figure 16:
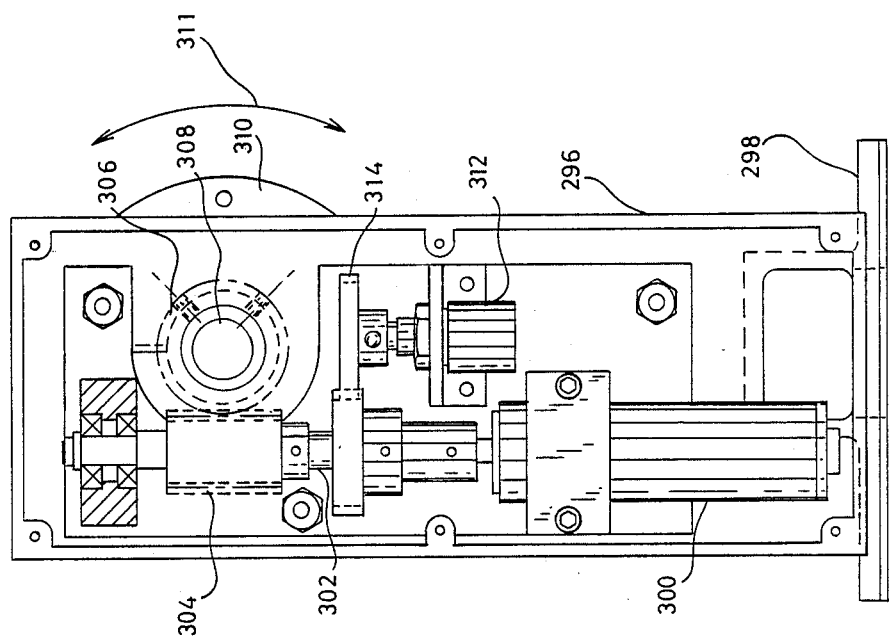
FIG. 16 is a cross-sectional view of apparatus for providing a tilt to a video camera unit mounted on the chassis of the present vehicle.

As mentioned above, the video camera unit 86 shown in FIG. 1 as mounted on the main chassis 16 is provided with means for tilting and panning in order to direct the camera and its associated light to a selected location. Mechanisms for accomplishing these two motions are illustrated in FIGS. 16 and 17. In FIG. 16, for example, a tilt mechanism is illustrated. This has a housing 296 provided with a flange 298 for attachment to the pan equipment of FIG. 17. Positioned within this body 296 is an electric motor 300 for driving a shaft 302. This shaft carries a worm gear 304 which meshes with a complimentary worm gear 306 to cause rotation to a shaft 308. Attached to shaft 308 is a mounting disk 310 to which the camera and its associated equipment are mounted. Thus, when the motor 300 is operated, the disk 310 can be rotated in either direction indicated by the arrow 311 to elevate or depress the aim of the video equipment attached thereto. During this motion, the relative tilt position of the video equipment is monitored by a potentiometer 312 driven by appropriate gears 314. Although not shown in this figure, wires for operating the camera (including a zoom lens) and lights, for the motor and for the potentiometer exit through the flange 298 and are directed to appropriate circuits within the body 50.

FIG. 17 is a cross-sectional drawing illustrating the pan mechanism to which the tilt mechanism is attached. An electric drive motor 316 is coupled to an appropriate gear train 318. This, in turn, provides for the rotation of a cup-shaped element 320 to which the flange 298 of the tilt mechanism is attached. The relative position of this cup-shaped member 320 with respect to the body 322 is monitored by a potentiometer 324 as driven by appropriate gearing 326. When the description of FIG. 17 is combined with that of FIG. 16, it can be seen how the video equipment 86 can be both rotated and tilted as desired.

Figure 18:
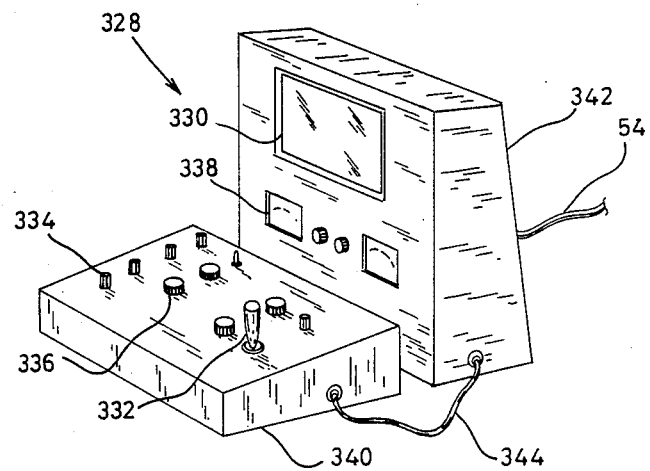
FIG. 18 is an isometric view of a typical remote control station for use with the vehicle of FIG. 1.

Having described in some detail the essential mechanical features of the vehicle of the present invention, a further understanding of the vehicle and its operation will become apparent upon a consideration of the following description. As stated above, the vehicle can be operated by signals conveyed to the vehicle by the cable 54 of FIG. 1. Alternatively, the signals can be transmitted by other means as will be known by those versed in the art. In order, however, to generate the necessary signals, a control station such as illustrated at 328 in FIG. 18 is typically utilized. This control unit can be portable as indicated in this figure, or can be established control equipment mounted within a control van or the like, depending upon the particular applications to which the vehicle is to be applied. This particular embodiment envisions the use of the cable 54 transmission of signals. The control unit typically would include a video screen 330 to view the output of the video equipment carried by the vehicle. Furthermore, it typically would have at least one "joy" stick 332 for directing the vehicle forward, rearward or through various turning maneuvers. The controls typically would include various switches 334, adjustment means 336 and meters or the like 338 to monitor and/or control various aspects of the operation of the vehicle and its associated equipment. For example, these switches would control the video equipment such as the pan, tilt and zoom characteristics. Other controls would provide for the operation of the arm components. Where the control unit is portable, it may be desirable to divide the components into the cabinets indicated at 340, 342 and connect the same with an appropriate wiring 344. Of course, various other control and monitoring equipment can be incorporated into this overall control system.

In a typical utilization of the present invention, the vehicle would be placed at an appropriate point for initiation of its mission. For example, the vehicle could be transported to a particular location in a van and thence moved to its initiation point through the use of the control unit 328. Thereafter, guidance is controlled as desired as the vehicle moves into a particular area for its operation. The video cameras carried by the vehicle provide the signal to the video screen 330 on the control panel 342 such that an operator can direct the motion of the vehicle across various terrains, either external to an installation or internal as may be the case. The vehicle can be adapted to climb stairs through the proper orientation of the auxiliary chassis members 30, 40 in a manner indicated, for example, in FIGS. 2-4. When the vehicle has reached a specific location to carry out a mission, the arm 60 carried by the body can be manipulated into a desired position through the operation of the aformentioned drive motors. If the arm position is to be to the side of the vehicle, the shoulder roll mechanism 80 is utilized to produce this additional degree of motion to the arm 60. Throughout the motion of the arm, the video equipment 82 attached thereto is continuously directed to an area immediately adjacent the end of the arm. Other viewing can be accomplished using the video equipment 86 attached to the body and employing the tilt and pan equipment, and the zoom lens, described hereinabove. During the motion of the vehicle, the clutch mechanism 286 can be disengaged so that cable is withdrawn from the drum as the vehicle moves forward. If a reverse direction is required, the clutch can be engaged so that the cable is rewound onto the drum during this rearward motion. Also, as previously discussed, the clutch can be used to couple the drum to the drive motor, with the motor not running such that the motor serves as a brake. Moving of the vehicle forward under this condition will draw cable from another source. Thus, it is seen that the present invention is truly an all-purpose vehicle for remotely controlling the same in various environments over various types of terrain. Through the substitution of various equipment carried by the arm 60, many types of missions can be carried out by the present invention. Furthermore, various weapons can be releasably attched to the forearm 68.

From the foregoing, it will be understood by persons versed in the art that an all terrain vehicle has been developed that is compact, versatile and useful for many tasks where such a vehicle is highly desirable. Although specific construction is illustrated with regard to components of this vehicle, these are given as an illustration of a typical embodiment rather than as a limitation. Thus, the invention is to be limited only by the appended claims and their equivalents when taken in combination with this detailed description.

We claim:

1. An all terrain vehicle adapted for remote control operation in potentially hostile environments, which comprises:

a main chassis having a forward end and a rearward end, said main chassis equipped with a pair of rotatable sprockets on each side thereof, at least one of said sprockets being driven, said pair of sprockets on each side of said main chassis having a flexible main track engaged therewith, said main track supporting said vehicle on said terrain and moving said vehicle across said terrain;

a first auxiliary chassis pivotally mounted on said forward end of said main chassis, said first auxiliary chassis equipped with a pair of rotatable sprockets on each side thereof, at least one of said sprockets being driven, said pair of sprockets on each side of said first auxiliary chassis having a flexible first auxiliary track engaged therewith for further supporting said vehicle on said terrain and moving said vehicle across said terrain;

a second auxiliary chassis pivotally mounted on said rearward end of said main chassis, said second auxiliary chassis equipped with a pair of rotatable sprockets on each side thereof, at least one of said sprockets being driven, said pair of sprockets on each side of said second auxiliary chassis having a flexible second auxiliary track engaged therewith for further supporting said vehicle on said terrain and moving said vehicle across said terrain;

a first cylindrical axle substantially extending across said vehicle proximate said forward end of said main chassis, said first cylindrical axle provided with a cylindrical cavity along its length;

a first planetary gear drive means positioned within said cavity of said first cylindrical axle for driving one sprocket on one side of said main chassis and one sprocket of said first auxiliary chassis on a corresponding side;

a second planetary gear drive means positioned within said first cylindrical axle for pivoting said first auxiliary chassis with respect to said main chassis;

a second cylindrical axle substantially extending across said vehicle proximate said rearward end of said main chassis, said second cylindrical axle provided with a cylindrical cavity along its length;

a third planetary gear drive means positioned within said cavity of said second cylindrical axle for driving one sprocket on a second side of said main chassis and one sprocket of said second auxiliary chassis on a corresponding side;

a fourth planetary gear drive means positioned within said cavity of said second cylindrical axle for pivoting said second auxiliary chassis with respect to said main chassis;

a body member mounted upon said main chassis, said body member provided with a hermetically sealed cavity;

table arm unit pivotally mounted on said body member, said arm unit having a shoulder joint providing for rotation about both a vertical axis and a horizontal axis relative to said main chassis member, an elbow joint providing for rotation about a horizontal axis relative to said main chassis, an upper arm joining said shoulder joint to said elbow joint, and a wrist joint releasably joined to a forearm portion joining said elbow joint with said wrist joint providing for rotation about an axis of said forearm;

adaptive means attached to said wrist joint for releasable attachment of apparatus to carry out selected actions by said vehicle in said environment;

drive means located in said shoulder joint, said elbow joint and said wrist joint for producing selected movements of said shoulder, elbow and wrist joints, respectively;

cable reel means, with a cable drum, carried by said body member, said cable reel means including drive means having a clutch means, said clutch means providing for selected conditions of rotation of said cable drum by said drive means of said cable reel means;

a cable associated with said cable drum, said cable selectively wound onto and drawn from said cable drum by said drive means of said cable reel means in cooperation with said clutch means, said cable having a first end and a distal end;

circuit means in said cavity of said body member connected to said first end of said cable and to said drive means of said arm unit to convey signals on said cable to said drive means of said arm unit;

first position sensitive means connected between said first and second planetary gear drive means to provide an electrical signal as to pivotal motion of said first auxiliary chassis with respect to said main chassis;

second position sensitive means connected between said third and fourth planetary gear drive means to provide an electrical signal as to pivotal motion of said second auxiliary chassis with respect to said main chassis;

further position sensitive means connected to each said drive means of said shoulder and elbow joints to provide an electrical signal as to pivotal motion of said shoulder and elbow joints, respectively;

further circuit means in said cavity of said body member to receive said electrical signals from said first, second and further position sensitive means and transmit said signals thereof over said cable;

internal connections within said first and second cylindrical axles and within said arm unit to connect said drive means and said position sensitive means within said cylindrical axles and said arm unit to said circuit means and said further circuit means;

video means, including a video camera and illuminating devices, carried on said forearm of said arm unit;

further video means, including video camera illuminating devices and a zoom lens, carried on said body member of said vehicle;

adjustment means attached to said further video means to pivot said further video means around two perpendicular axes; and a remote control console connected to said distal end of said cable to transmit and receive over said cable signals between said console and said circuit means and further circuit means in said cavity of said body member.

2. The vehicle of claim 1 wherein said forearm portion of said arm unit is divided to a first and a second portion, and further comprises a wrist pitch means inserted between said first portion of said forearm and said second portion of said forearm, said wrist pitch means including drive means for bending said forearm at said wrist pitch means to simulate normal wrist bending of an individual.

3. The vehicle of claim 1 wherein said drive means of said cable reel means has an output shaft to said clutch means, wherein said cable drum is provided with an input shaft, and wherein said clutch means selectively couples and decouples said output shaft of said drive means to said input shaft of said cable drum.

4. The vehicle of claim 1 wherein each of said tracks on said main chassis and each of said tracks on said auxiliary chassis are provided with an idler sprocket in contact with said tracks to tension said tracks.

5. The vehicle of claim 1 further comprising disconnect means for releasably attaching said sprockets for said tracks of said main chassis to said first planetary gear drive means whereby, when said sprockets are released from said planetary gear drive means, said vehicle can be moved without power supplied to said first planetary gear drive means.

6. The vehicle of claim 1 wherein said adjustment means attached to said further video means comprises:

a pan motion means having a housing, a rotatable cup-shaped member disposed within said housing, said cup-shaped member having a first end and a further end, said further end provided with a circumscribing gear member, said further end having an attachment flange, a motor, a driven gear attached to said motor and meshed with said circumscribing gear, and a rotation monitoring unit attached to said circumscribing gear to provide an electrical signal as to rotation of said cup-shaped member; and a tilt motion means having a housing attached to said mounting flange of said pan motion means, a motor means within said tilt motion housing connected to worm gear means, a mounting plate for said further video means connected to said worm gear means whereby rotation of said motor of said tilt motion means rotates said mounting plate, and a further rotation monitoring unit attached to said motor means of said tilt motion means to provide a signal as to rotation of said mounting plate.

7. An all terrain vehicle adapted for remote control to operate in potential hostile environments, said vehicle being of the type having a main chassis and a forward and rearward auxiliary chassis pivotally mounted at forward and rearward hollow axles with respect to said main chassis, all said chassis provided with endless tracks driven by sprockets to move said vehicle across said terrain, said axles having internal drive means for driving said sprockets and for pivoting said auxiliary chassis, said main chassis having a control box and an arm deployable in a plane above said main chassis, remote control means for transmitting signals to and from said control box, and wiring means connecting said control box to components of said arm and to said drive means of said chassis, wherein the improvement comprises:

a cable reel means attached to said main chassis for receiving a cable connecting said remote control means and said control box, said cable reel means including a rotatable cable drum, means for rotating said drum, a drive means for said drum, and a clutch means for selectively connecting said drive means for said drum to said means for rotating said drum whereby said clutch means selects between free rotation, no rotation and driven rotation of said drum, a shoulder roll drive connecting said arm to said main chassis whereby said arm can be rotated about a vertical axis whereby said arm is operable to a side of said main chassis;

wherein said control box is sealed against penetration by elements of an environment surrounding said control box wherein said wiring means is enclosed within said arm and said control box; and wherein said drive means within said axles comprises a. a first planetary gear motor unit mounted within said forward axle and coupled to a sprocket driving a main track and to a sprocket driving a track of said forward auxiliary chassis on one side of said main chassis, b. a second planetary gear motor unit mounted within said forward axle and coupled with said forward auxiliary chassis for pivotal movement of said forward auxiliary chassis with respect to said main chassis, c. a third planetary gear motor unit mounted within said rearward axle and coupled to a sprocket driving a main track and to a sprocket driving a track of said rearward auxiliary chassis on a second side of said main chassis, and d. a fourth planetary gear motor unit mounted within said rearward axle and coupled to said forward auxiliary chassis for pivotal movement of said rearward auxiliary chassis with respect to said main chassis.

8. The vehicle of claim 7 wherein said arm is provided with a forearm having a first portion and a second portion, and further comprises a wrist pitch means joining said first and second portions of said forearm, said wrist pitch means including a drive means whereby said first portion of said forearm can be selectively bent with respect to said second portion of said forearm to simulate motion corresponding to wrist bending of an individual.

9. The vehicle of claim 7 wherein each of said tracks of said main vehicle and said auxiliary chassis are provided with an idler sprocket to maintain tension of said tracks.

10. The vehicle of claim 7 further comprising:

a first video unit releasably attached to said arm and directed toward a free end of said arm; and a second video unit attached to said main chassis, said second video unit provided with adjustment means to direct said second video toward a selected location, said adjustment means adapted to pan and tilt said second video unit.

11. The vehicle of claim 7 wherein said adjustment means attached to said second video unit comprises:

a pan motion means having a housing, a rotatable cup-shaped member disposed within said housing, said cup-shaped member having a first end and a further end, said further end provided with a circumscribing gear member, said further end having an attachment flange, a motor, a driven gear attached to said motor and meshed with said circumscribing gear, and a rotation monitoring unit attached to said circumscribing gear to provide a signal as to the rotation of said cup-shaped member; and a tilt motion means having a housing attached to said mounting flange of said pan motion means, a motor means within said tilt motion housing connected to worm gear means, a mounting plate for said further video means connected to said worm gear means whereby rotation of said motor of said tilt motion means rotates said mounting plate, and a rotation monitoring unit attached to said motor means of said tilt motion means to provide a signal as to rotation of said mounting plate.

* * * * *